United States Patent
Peng et al.

(10) Patent No.: US 9,608,520 B2
(45) Date of Patent: Mar. 28, 2017

(54) MODE CONTROL DEVICE, VOLTAGE CONVERTER, AND CONTROL METHOD USED IN THE VOLTAGE CONVERTER

(71) Applicant: SKYWORKS SOLUTIONS, INC., Woburn, MA (US)

(72) Inventors: Tao Peng, Shanghai (CN); Ji-Ming Chen, Shanghai (CN)

(73) Assignee: Skyworks Solutions, Inc., Woburn, MA (US)

( * ) Notice: Subject to any disclaimer, the term of this patent is extended or adjusted under 35 U.S.C. 154(b) by 76 days.

(21) Appl. No.: 14/291,403

(22) Filed: May 30, 2014

(65) Prior Publication Data

US 2015/0349630 A1  Dec. 3, 2015

(51) Int. Cl.
*H02M 3/156* (2006.01)

(52) U.S. Cl.
CPC .... *H02M 3/156* (2013.01); *H02M 2003/1566* (2013.01)

(58) Field of Classification Search
CPC .... H02M 3/156; H02M 3/158; H02M 3/1584; H02M 3/1588; Y02B 70/126; Y02B 70/1466
USPC .................................. 323/222, 272, 282–285
See application file for complete search history.

(56) References Cited

U.S. PATENT DOCUMENTS

| | | | | |
|---|---|---|---|---|
| 5,612,610 A | * | 3/1997 | Borghi | G05F 1/614 323/222 |
| 5,629,610 A | * | 5/1997 | Pedrazzini | H02M 3/156 323/283 |
| 8,786,264 B2 | * | 7/2014 | Muhammad | H02M 3/1584 323/269 |
| 2006/0273772 A1 | * | 12/2006 | Groom | H02M 3/157 323/284 |
| 2009/0153127 A1 | * | 6/2009 | Chen | H02M 3/1588 323/350 |
| 2010/0007318 A1 | * | 1/2010 | Faerber | H02M 3/156 323/283 |
| 2012/0182003 A1 | * | 7/2012 | Flaibani | H02M 3/156 323/284 |

(Continued)

FOREIGN PATENT DOCUMENTS

JP    2014007809 A    1/2014

OTHER PUBLICATIONS

International Search Report and Written Opinion for PCT/US2015/038322 dated Oct. 27, 2015.

(Continued)

*Primary Examiner* — Yemane Mehari
(74) *Attorney, Agent, or Firm* — Chang & Hale LLP (57) ABSTRACT

A voltage converter can include a voltage conversion circuit having an inductor configured to be charged and discharged to facilitate conversion of an input voltage to an output voltage, and a switch configured to allow the inductor to be charged and discharged. The voltage converter can further include a logic drive unit configured to provide a drive signal to the switch to control the charging and discharging of the inductor. The voltage converter can further include a mode control unit configured to provide a mode-switching signal to the logic drive unit to control switching between a continuous control mode and a discontinuous control mode based on an inductance current associated with the inductor and a constant load-current threshold.

20 Claims, 6 Drawing Sheets

(56) References Cited

U.S. PATENT DOCUMENTS

2014/0217959 A1* 8/2014 Chen .................. H02J 7/0052
                                                 320/107
2015/0349630 A1* 12/2015 Peng .................. H02M 3/156
                                                 323/282

OTHER PUBLICATIONS

Yu et al., "Design of a Tripple-Mode DC-DC Buck Converter", Journal of IKEEE, 2011, vol. 12, No. 2, pp. 134-142 (English Abstract).
Chia, et al., "A High-Efficiency PWM DC-DC Buck Converter with a Novel DCM Control under Light-Load", Circuits and Systems, 2011, IEEE International Symposium, pp. 237-240.

* cited by examiner

MODE CONTROL DEVICE, VOLTAGE CONVERTER, AND CONTROL METHOD USED IN THE VOLTAGE CONVERTER

TECHNICAL FIELD

The present application relates to a field of electronic technique, and more particularly, to a mode control device for a voltage converter, a voltage converter, and a control method used in the voltage converter.

BACKGROUND

Electronic apparatus typically includes therein electronic modules such as different subsystems, electronic circuits, and so on. These modules usually require different supply voltages for achieving normal operations thereof. For example, an analog power amplifier may require a supply voltage of 3.5 volts, a digital processing module may require different supply voltages of 1.8 volts, 5 volts etc. To ensure normal operations of the respective electronic modules in the electronic apparatus, a voltage converter is required to convert a DC voltage (e.g., a voltage from a battery) into another different DC voltage as required by an individual module, that is, a specific input voltage Vin is converted into a different output voltage Vout.

In existing voltage converters, for example, electric energy at an input is stored transitorily in an inductor and/or a capacitor (i.e., a charging process is performed), and thereafter electric energy is released at a different voltage at an output (i.e., a discharging process is performed), so that the input voltage Vin is converted into the desired output voltage Vout. Accordingly, a drive signal is employed to drive a control device (e.g., a switch) in the voltage converter, by which the charging process and the discharging process are controlled so as to obtain the desired output voltage Vout, that is, a turn-on time Ton during which a corresponding switch is closed to charge and a turn-off time Toff during which the switch is open to discharge are controlled. The turn-on time Ton corresponds to a pulse width of the drive signal.

In the operation process of the voltage converter, a situation where impedance of a load (e.g., an electronic module) driven by its output voltage Vout changes may occur, for example, when an operation state of the electronic module changes, and its impedance value relative to the voltage converter will change. In this case, in order to improve conversion efficiency of the voltage converter, it may need to adopt different control methods to control the charging operation and discharging operation of the voltage converter. For example, when the load driven by the output voltage Vout is a medium or heavy load whose load value is relatively large, a continuous control mode (CCM) may be adopted to control the voltage converter; when the load driven by the output voltage Vout is a light load whose load value is relatively small, a discontinuous control mode (DCM) may be adopted to control the voltage converter. In the continuous control mode, the drive signal drives a control device in the voltage converter to make the voltage converter perform charging and discharging operations continuously; and in the discontinuous control mode, the drive signal drives a control device in the voltage converter, so that the voltage converter can halt for some time after performing charging and discharging operations, and thereafter again perform charging and discharging operations.

When the load driven by the output voltage Vout changes from a medium load into a light load, the control mode of the voltage converter needs to be switched from a continuous control mode to a discontinuous control mode. Typically, mode switching is carried out based on load current on the driven load, and threshold of the load current for carrying out mode switching usually varies along with the input voltage Vin and the output voltage Vout of the voltage converter, which makes it difficult to perform mode switching accurately, thus lowers power efficiency of the voltage converter accordingly. Further, variation of the on-off frequency of the control device will also increase noise in the output voltage Vout.

SUMMARY

Aspects of the present application may relate to a mode control device for a voltage converter, a voltage converter, an electronic apparatus including the voltage converter, and a control method used in the voltage converter etc.

The mode control device in an embodiment of the present application may be applicable to controlling a voltage converter to switch from a continuous operation mode to a discontinuous operation mode. The voltage converter converts an input voltage to an output voltage Vout, which may be used for powering a load. The voltage converter may comprise: a voltage conversion circuit including a control device and an inductor, the inductor being capable of performing charging and discharging operations, the control device for operating under driving of a drive signal to control charging and discharging operations of the inductor; a logic drive unit for adjusting an operation mode for the voltage conversion circuit, and generating the drive signal for driving the control device, so as to obtain a desired output voltage; and a mode control device for generating a mode switching signal that controls switching from a continuous control mode to a discontinuous control mode based on inductance current on the inductor, the mode switching signal enabling the voltage converter to be capable of switching from the continuous control mode to the discontinuous control mode at a constant load current threshold, in which case the load current threshold can be independent of the input voltage and the output voltage of the voltage converter.

The mode control device may include: an inductance signal detection unit for detecting inductance current flowing on an inductor in the voltage conversion circuit, and outputting a detection signal; a compensation unit for compensating for change of an input voltage and an output voltage of the voltage converter so as to switch from a continuous control mode to a discontinuous control mode at a constant load current threshold, and outputting a compensated switching threshold corresponding to the inductance current; and a mode switching determination unit for determining whether to switch from the continuous control mode to the discontinuous control mode based on the detection signal from the inductance signal detection unit and the switching threshold from the compensation unit, and generating a mode control signal indicating whether to switch from the continuous control mode to the discontinuous control mode.

The mode control method according to an embodiment of the present application may include: detecting inductance current flowing on an inductor for performing charging and discharging operations in a voltage converter, and outputting a detection signal; compensating for change of an input voltage and an output voltage of the voltage converter so as to switch from a continuous control mode to a discontinuous control mode at a constant load current threshold, and outputting a compensated switching threshold corresponding to the inductance current; and determining whether to switch from the continuous control mode to the discontinuous control mode based on the detection signal and the switching threshold, and generating a mode control signal indicating whether to switch from the continuous control mode to the discontinuous control mode.

In the technical solutions according to the embodiments of the present application, whether to switch from a continuous control mode to a discontinuous control mode is determined based on the inductance current flowing on the inductor in the voltage converter, and change of the input voltage and the output voltage of the voltage converter are compensated when determining the switching threshold, so that the voltage converter can switch from the continuous control mode to the discontinuous control mode accurately at a constant load current threshold, which improves power efficiency of the voltage converter and reduces noise in the output voltage caused by change of the on-off frequency in a control device.

BRIEF DESCRIPTION OF THE DRAWINGS

In order to more clearly explain the technical solutions, drawings referenced in the description of embodiments or conventional technologies are briefly introduced below. The drawings described below are merely some embodiments of the present invention, a person of ordinary skill in the art can also obtain other drawings according to these drawings. Identical reference numerals typically indicate identical components throughout these drawings.

DETAILED DESCRIPTION

The voltage converter to which the present application relates may be a boost converter, a buck converter, or a boost-buck converter etc. The voltage converter converts a supply voltage to voltages required by individual electronic modules in an electronic apparatus, the electronic modules for example are an RF amplifier, a display device, and so on. The electronic apparatus including electronic modules for example is a mobile phone, a tablet computer, a monitor, an e-book reader, a portable digital media player, and so on. Types of the voltage converter, electronics modules to which the power is supplied, and electronic apparatus to which it is applied does not constitute a limitation to the present application.

Figure 1:
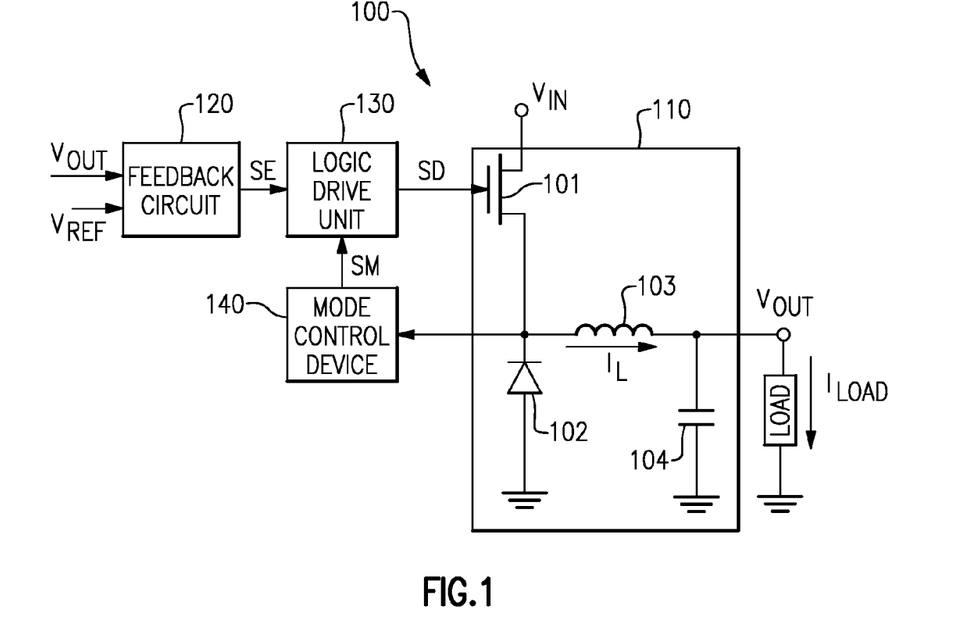
FIG. 1 is a block diagram schematically illustrating a voltage converter including a mode control device according to an embodiment of the present application.

FIG. 1 is a block diagram schematically illustrating a voltage converter including the mode control device according to an embodiment of the present application. The voltage converter 100 shown in FIG. 1 converts an input voltage Vin into an output voltage Vout, which may be used for powering a load.

As shown in FIG. 1, the voltage converter 100 may comprise: a voltage conversion circuit 110 including a triode 101 and an inductor 103, the inductor 103 being located between an output terminal of the triode 101 and a port of the output voltage Vout and for performing charging and discharging operations, the triode 101 being for operating under driving of the drive signal Sd to control the charging and discharging operations of the inductor 103; a feedback circuit 120 for receiving an output feedback (e.g., output voltage Vout) of the voltage converter 100, comparing it with a reference voltage Vref that corresponds to a target voltage to be output, and outputting an error control signal Se; a logic drive unit 130 for adjusting an operation mode for the voltage conversion circuit 110, generating a drive signal Sd for driving the triode 101 according to the error control signal Se output by the feedback circuit 120, so as to obtain the desired output voltage Vout; and a mode control device 140 for generating a mode switching signal Sm that controls switching from a continuous control mode to a discontinuous control mode based on the inductance current on the inductor 103, the mode switching signal Sm enabling the voltage converter to switch from the continuous control mode to the discontinuous control mode at a constant load current threshold, the load current threshold being constant means that the load current threshold is independent of the input voltage Vin and the output voltage Vout.

As shown in FIG. 1, in addition to the triode 101 and the inductor 103, the voltage conversion circuit 110 may further comprise: a diode 102 having a cathode connected to the input voltage Vin via the triode 101, and having an anode being grounded; and a capacitor 104 connected between the port of the output voltage Vout and the ground, for ensuring stable output of the output voltage Vout.

During the charging process, the triode 101 is turned on, the diode 102 is open, the inductor 103 is charged and the inductance current is generated; since the input voltage Vin is direct current (DC), the inductance current on the inductor 103 increases linearly with a certain rate, correspondingly, current passes through two ends of the load, so as to have the output voltage. During the discharging process, the triode 101 is tuned off, the diode 102 is in a short circuit, because of a holding characteristic of the inductance current, the current that passes through the inductor L will slowly decrease from a value when the charging is completed, until a next charging process starts or the current value drops to zero, correspondingly, the inductor L starts to charge the capacitor C, thereby the output voltage Vout is maintained.

The triode 101 in FIG. 1 is a control device for controlling the charging and discharging operations of the voltage converter. In the voltage conversion circuit 110 in FIG. 1, the diode 102 may also be replaced with a triode, this alternative triode is turned off during the charging process, and turned on during the discharging process. The logic drive unit 130 may generate a drive signal for the alternative triode. In this case, the control device for controlling the voltage converter includes both the triode 101 and this alternative triode.

Figure 2:
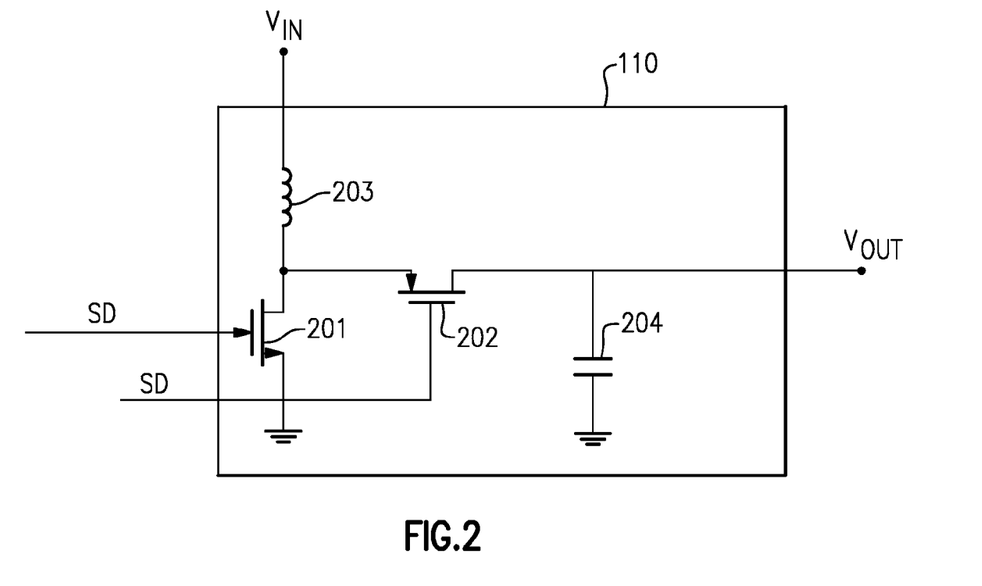
FIG. 2 schematically illustrates a circuit diagram of a boost conversion circuit in a boost converter.

The voltage converter 110 in FIG. 1 is a buck conversion circuit. In a case where the voltage converter is a boost converter, the voltage conversion circuit 110 is a boost conversion circuit; in a case where the voltage converter is a boost-buck converter, the voltage conversion circuit 110 is a boost-buck conversion circuit. FIG. 2 schematically illustrates a circuit diagram of a boost conversion circuit in a boost converter.

As shown in FIG. 2, the boost conversion circuit comprises: an inductor 203 for receiving the input voltage Vin, and being grounded via the triode 201, the inductor 203 being charged during the turn-on time Ton and discharged during the turn-off time Toff; a capacitor 204 having one end connected to a connection point of the inductor 203 and the triode 201 via the triode 202, and the other end being grounded, the capacitor 204 being for ensuring stable output of the output voltage Vout. The triodes 201 and 202 may control the conversion operation of the voltage conversion circuit 110 under driving of the drive signal output from the logic drive unit 130. During the charging process, the triode 201 is turned on, the triode 202 is turned off; in the discharging process, the triode 201 is turned off, the triode 202 is turned on. The triodes 201 and 202 are control devices in the boost converter. Similarly, there may be more control devices for the boost-buck voltage conversion circuit of the boost-buck voltage converter.

The feedback circuit 120 forms a feedback loop for the voltage converter 100, which, for example, may be implemented by an error amplifier, compares the output voltage Vout with the reference voltage Vref, and generates an error control signal Se, thereby controlling the charging and discharging operations, so that the output voltage Vout is close to a desired target voltage. Furthermore, the feedback circuit 120 may further includes a voltage divider for dividing the output voltage Vout, and use the error amplifier to compare a portion of the output voltage Vout with the corresponding reference voltage.

The logic drive unit 130 may control the operation mode of the voltage conversion circuit 110 according to the mode switching signal Sm output from the mode control device 140, the operation mode may, for example, include a continuous control mode, a discontinuous control mode etc. The continuous control mode may for example be a pulse width modulation (PWM), and the discontinuous control mode may for example be a pulse frequency modulation (PFM).

In the pulse width modulation mode, the voltage converter has a fixed on-off frequency fsw, which is equal to a reciprocal of a work period Tsw of the control device of the voltage converter, i.e., fsw=1/Tsw=1/(Ton+Toff), wherein Ton is a turn-on time during which a switch (e.g., triode 101 in FIG. 1) is turned on to charge and Toff is a turn-off time during which the switch is turned-off to discharge; during the operation process of the voltage converter, the charging and discharging operations are changed by changing the turn-on time Ton and the turn-off time Toff, but the turn-on time Ton cannot be infinitely small, for it is hard for the voltage converter to work in the pulse width modulation mode when the load driven by the voltage converter is very small. Accordingly, the pulse width modulation mode is usually applied to cases in which the load driven by the voltage converter is a medium or heavy load. In the pulse frequency modulation mode, the on-off frequency fsw of the voltage converter may vary, and may be zero, i.e., the voltage converter may be in a discontinuous control mode in which it operates discontinuously, and thereby being applicable to a case where the load driven by the voltage converter is the light load.

As for when the load of the voltage converter is a medium load or a light load, it may be determined by setting a load threshold based on an input voltage, a driving capability of the voltage converter etc., if the load of the voltage converter is greater than or equal to the load threshold, then it is a medium load, if the load of the voltage converter is less than the load threshold, then it is a light load or heavy load. As an example, when the input voltage of the voltage converter is relatively high, the load threshold becomes larger; when the input voltage of the voltage converter is relatively small, the load threshold becomes smaller.

The logic drive unit 130 also receives the error control signal Se from the feedback circuit 120, and generates a drive signal Sd for driving the triode 101 based on the mode switching signal Sm and the error control signal Se, so as to obtain the desired output voltage Vout. As for the logic drive unit including the respective operation modes, it may be implemented with the existing techniques or a variety of techniques that may appear in the future, and its specific implementations do not constitute a limitation to the embodiments of present technical.

Hereinafter, for convenience of the description, it is assumed that when the load of the voltage converter changes from a medium load to a light load, the voltage converter switches from the pulse width modulation to the pulse frequency modulation. This is merely an example, and embodiments of the present application can also be applied to switching from other continuous control modes to other discontinuous control modes.

In the conventional mode control technique, whether to switch from the continuous control mode to the discontinuous control mode can be determined for example based on current (i.e., load current) on the load driven by the voltage converter, and the switching threshold in this mode control technique usually varies along with the input voltage Vin and the output voltage Vout of the voltage converter, which makes it difficult to perform mode switching accurately. Thus, power efficiency of the voltage converter decreases accordingly. Variation of the on-off frequency in the control device will also increase noise in the output voltage Vout.

The mode control device 140 according to the embodiment of the present application can generate a mode switching signal Sm for controlling the voltage converter to switch from the continuous operation mode to the discontinuous operation mode based on the inductance current $I_L$ on the inductor 103. The mode switching signal Sm is independent of the input voltage Vin and the output voltage Vout of the voltage converter. In the voltage converter, according to a principle of conservation of energy, when the driven load reduces from a medium load to a light load, the current flowing through the load reduces accordingly, thus it needs to switch from a continuous control mode to a discontinuous control mode by, for example, switching from the pulse width modulation mode to the pulse frequency modulation mode. When the load current $I_{Load}$ flowing through the driven load decreases, the inductance current $I_L$ flowing through the inductor in the voltage conversion circuit of the voltage converter (e.g., inductor 103 in FIG. 1, inductor 203 in FIG. 2) also decreases; when the load current $I_{Load}$ flowing through the driven load increases, the inductance current $I_L$ flowing through the inductor also increases. Accordingly, in the present application, the mode switching signal Sm for controlling the voltage converter to switch from a continuous operation mode to a discontinuous operation mode is generated based on the inductance current $I_L$. The mode control device 140 compares the inductance current $I_L$ with the compensated switching threshold, determines whether to switch from a continuous operation mode to a discontinuous operation mode based on the comparison result, and generates the corresponding mode control signal Sm. The mode control signal Sm compensates for change of the input voltage Vin and the output voltage Vout in the voltage converter, so that the voltage converter switches from a continuous operation mode to a discontinuous operation mode at a constant load current threshold, rather than changing the load current threshold according to the input voltage Vin and the output voltage Vout. The mode control device 140 will be described in further detail below.

The voltage converter to which the mode control device is applied as described in the embodiment of the present application is merely illustrative, and may also include other sections. For example, it may include a frequency oscillator, a low current control circuit for controlling a low current in the pulse frequency modulation mode, and so on.

Figure 3:
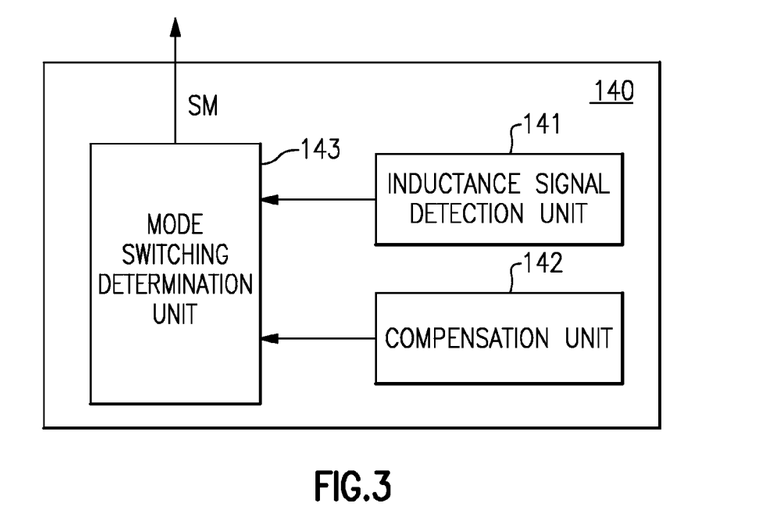
FIG. 3 is a block diagram schematically illustrating the mode control device according to an embodiment of the present application.

FIG. 3 is a block diagram schematically illustrating the mode control device (140 in FIG. 1) according to an embodiment of the present application. The mode control device may be applied to the voltage converter described above in conjunction with FIGS. 1 and 2, and it includes, but is not limited to, a boost converter, a buck converter, a boost-buck converter etc.

As shown in FIG. 3, the mode control device 140 may include: an inductance signal detection unit 141 for detecting inductance current flowing on the inductor in the voltage conversion circuit 110, and outputting a detection signal; a compensation unit 142 for compensating for change of the input voltage Vin and the output voltage Vout of the voltage converter so as to switch from a continuous control mode to a discontinuous control mode at a constant load current threshold, and outputting a compensated switching threshold corresponding to the inductance current; and a mode switching determination unit 143 for determining whether to switch from a continuous control mode to a discontinuous control mode based on the detection signal from the inductance signal detection unit 141 and the switching threshold from the compensation unit 142, and generating a mode control signal Sm indicating whether to switch from the continuous control mode to the discontinuous control mode.

The detection signal output by the inductance signal detection unit 141 may be inductance current flowing on the inductor in the voltage conversion circuit 110, or may also be a voltage signal corresponding to the inductance current. The inductance signal detection unit 141 may adopt various techniques to detect the inductance current flowing on the inductor (e.g., inductor 103 in FIG. 1 and inductor 203 in FIG. 2). For example, it may use a resistor with an extremely small resistance to separate a small part of current signals from the inductor, or it may also use a variable resistance area of a power tube (e.g., MOSFET) to detect the inductance current, and accordingly, the inductance signal may be detected by detecting a voltage between a source and a drain when it operates in the variable resistance area. The techniques for detecting the inductance signal as adopted by the inductance signal detection unit 141 do not constitute a limitation to the embodiments of the present application.

The compensation unit 142 can compensate for change of the input voltage Vin and the output voltage Vout of the voltage converter, so that the voltage converter switches from the continuous control mode to the discontinuous control mode at a constant load current threshold. Hereinafter, description is provided with the voltage converter being a buck converter (e.g., having a buck converter unit 110 shown in FIG. 1), and where the continuous control mode is the PWM control mode, and the discontinuous control mode is the PFM control mode as an example.

Figure 4:
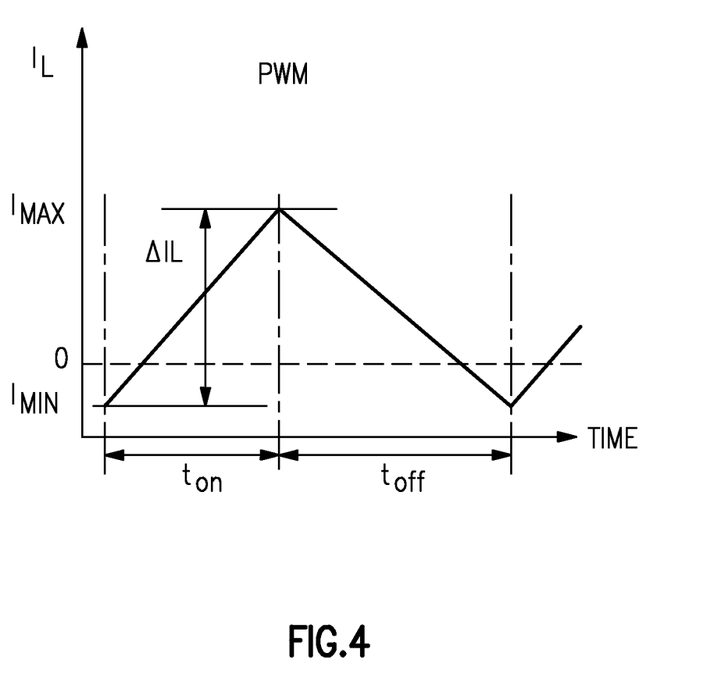
FIG. 4 schematically illustrates a signal diagram of inductance current of a buck converter in a PWM mode.

FIG. 4 schematically illustrates a signal diagram of inductance current of a buck converter in a PWM mode. As shown in FIG. 4, the inductor is charged during a time period of Ton, the inductance current $I_L$ increases accordingly, until it increases to a maximum $I_{Lmax}$; the inductor is discharged during a time period of Toff, the inductance current decreases from the maximum $I_{Lmax}$ accordingly, until it is reduced to a minimum $I_{Lmin}$ And so on, and so forth. Difference between the maximum and the minimum of the inductance current $I_L$ represents a current ripple $\Delta I_L$ on the inductor, and the following Equation (1) representing the current ripple $\Delta I_L$ can be obtained according to the inductance current of the voltage converter during the turn-on time Ton and turn-off time Toff:

$$\Delta I_L = \frac{Tsw * (Vin - Vout) * Vout}{L * Vin} \qquad \text{Equation (1)}$$

where Tsw is a work cycle of the buck converter, and equal to a sum of the turn-on time Ton and turn-off time Toff, Vin is the input voltage of the buck converter, Vout is the output voltage of the buck converter, and L is the inductance value of the inductor (103 in FIG. 1) in the buck converter.

In FIG. 4, taking value of the inductance current being zero as a boundary, curve of the inductance current above the value of zero form a positive triangle, curve of the inductance current below the value of zero form an negative triangle, value of the positive triangular and that of the negative triangular are calculated respectively and then added, to obtain a relationship among the current $I_{Load}$ on the load driven by the buck converter, the current ripple $\Delta I_L$, and the minimum $I_{Lmin}$ of the inductance current, as shown in the following Equation (2):

$$I_{Load} = \frac{(\Delta I_L - I_{Lmin})^2 - I_{Lmin}^2}{2 * \Delta I_L}. \qquad \text{Equation (2)}$$

The Equation (2) can be simplified to the following Equation (3):

$$I_{Load} = \frac{\Delta I_L}{2} - I_{Lmin}. \qquad \text{Equation (3)}$$

As described in the preceding, when the load current $I_{Load}$ flowing through the driven load decreases, the inductance current $I_L$ flowing through the inductor of the voltage converter also decreases. When the load current $I_{Load}$ is a minimum in the PWM mode (i.e., $I_{Load}=I_{PFM}$), the voltage converter switches to the PFM mode, accordingly, the inductance current $I_L$ on the inductor also reaches its minimum, i.e., reaching a switching threshold $I_{LZC}$ based on which mode switching is to be carried out. Accordingly, Equation (3) can be transformed into the following Equation (4):

$$I_{LZC} = \frac{\Delta I_L}{2} - I_{PFM}. \qquad \text{Equation (4)}$$

The following Equation (5) can be obtained by substituting Equation (1) into Equation (4):

$$I_{LZC} = \frac{Tsw * (Vin - Vout) * Vout}{2 * L * Vin} - I_{PFM}. \quad \text{Equation (5)}$$

According to Equation (5), it can be known that, when the mode control device 140 according to the embodiment of the present application determines to switch from a continuous operation mode to a discontinuous operation mode based on the switching threshold $I_{LZC}$ of the inductance current $I_L$, Equation (5) may be achieved by the compensation unit 142. During the process where the compensation unit 142 achieves Equation (5), it may keep $I_{PFM}$ constant by compensating for change of the input voltage Vin and the output voltage Vout when achieving the first item in Equation (5).

For the PWM mode, both Tsw and L at the right side of Equation (5) are fixed, $I_{PFM}$ is fixed also and may be preset, thus the compensation unit 142 can detect the input voltage Vin and the output voltage Vout of the voltage converter, and then achieve Equation (5). The compensation unit 142 may compensate for change of the input voltage Vin and the output voltage Vout of the voltage converter, so as to ensure switching from the PWM mode to the PFM mode at a constant load current $I_{PFM}$.

Alternatively, in order to more conveniently achieve the compensation unit 142, Equation (5) may also be transformed to the following Equation (6):

$$I_{LZC} = \frac{Tsw * (1 - D) * Vout}{2 * L} - I_{PFM}, \quad \text{Equation (6)}$$

where D is a duty cycle of the voltage converter and equals to Vout/Vin. The (1−D)*Vout in Equation (6) may be achieved by sampling Vout, where the sampling clock is fsw, because fsw is composed by the turn-on time Ton and turn-off time Toff, and the (1−D) is equal to Toff*fsw. Therefore, (1−D)*Vout in Equation (6) can be implemented conveniently. Tsw and L in Equation (6) are given when designing the voltage converter, and the load current $I_{PFM}$ is also a constant value, thus Equation (6) can be achieved conveniently to obtain the switching threshold $I_{LZC}$.

The above description provided in conjunction with Equations (1) to (6) shows an example of how to set the switching threshold $I_{LZC}$ in the buck converter so as to maintain $I_{PFM}$ constant. When the voltage converter changes, setting of the switching threshold $I_{LZC}$ is also probable to change appropriately. For example, when the voltage converter is a boost converter, Equation (1) used above for the current ripple $\Delta I_L$ of the buck converter is changed to the following Equation (7):

$$\Delta I_L = \frac{Tsw * (1 - D) * (Vout - Vin)}{L}, \quad \text{Equation (7)}$$

where D is a duty cycle of the boost converter, and equals to (Vout−Vin)/Vout, but not equals to Vout/Vin of the buck converter. Further, the above Equation (4) becomes the following Equation (8):

$$I_{Load} = \frac{\Delta I_L}{2}(1 - D) - I_{Lmin}. \quad \text{Equation (8)}$$

The following Equation (9) can be obtained by replacing Equation (7) into Equation (8):

$$I_{LZC} = \frac{Tsw * (1 - D)^2 * (Vout - Vin)}{2 * L} - I_{PFM}, \quad \text{Equation (9)}$$

Figure 5:
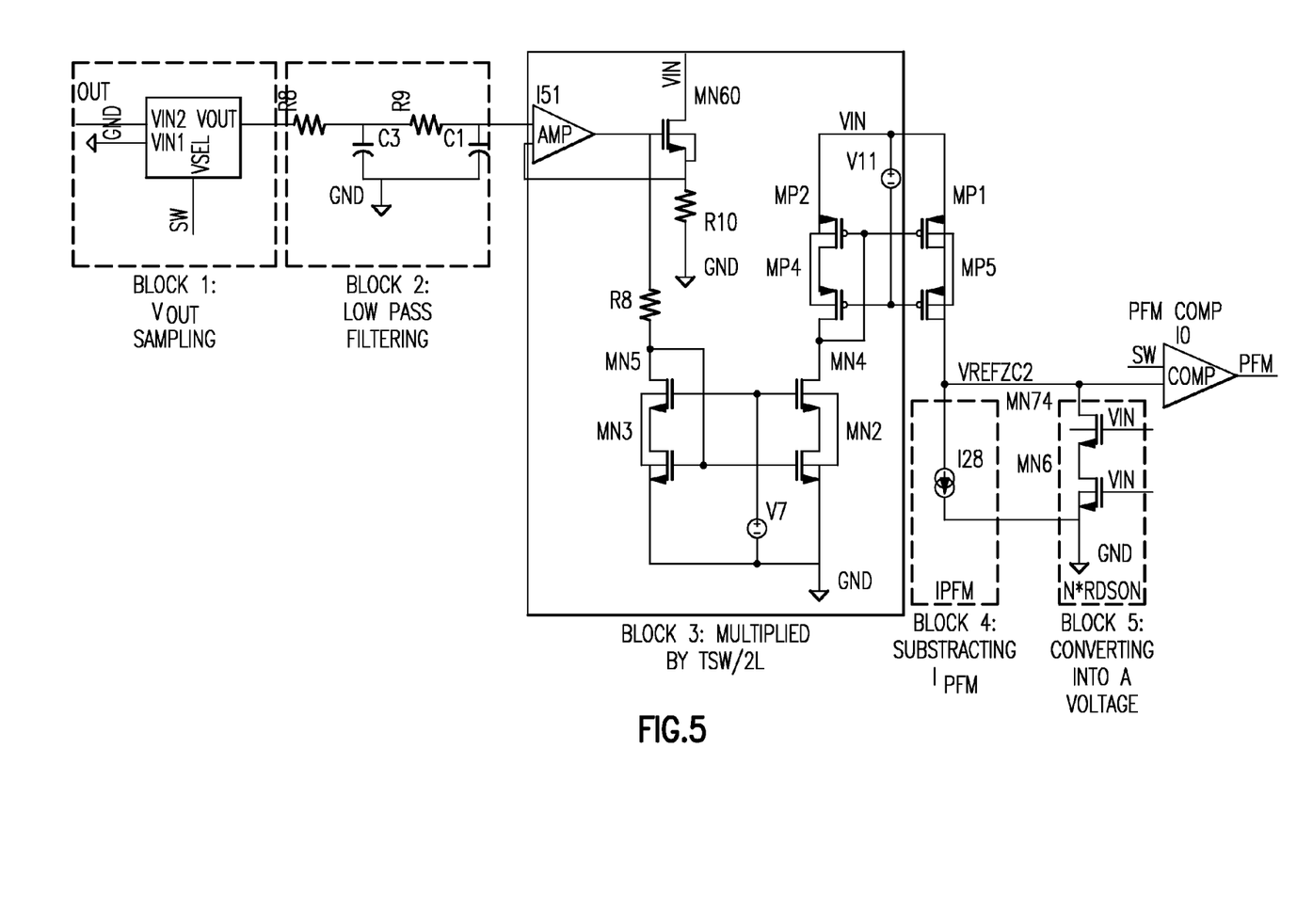
FIG. 5 is a circuit diagram schematically illustrating the compensation unit in FIG. 3.

FIG. 5 is a circuit diagram schematically illustrating that the compensation unit 142 obtains the switching threshold $I_{LZC}$ from Equation (6). As shown in FIG. 5, for convenience of the description, the circuit diagram of the compensation unit 142 is divided into five blocks, Block 1 to Block 5, as shown by each block in FIG. 5. In block 1, an on-off control signal with a frequency of fsw is used to sample/hold the output voltage Vout of the voltage converter; then, low pass filtering is performed on the sampled Vout signal using Block 2, so as to obtain the (1−D)*Vout in Equation (6) (i.e., the output DC level); in Block 3, a voltage signal output from Block 2 is converted into a current signal, Tsw/2 L is determined, and multiplied with a current signal corresponding to (1−D)*Vout, so as to obtain the first item in Equation (6); in Block 4, a preset constant load current $I_{PFM}$ is obtained using a current source, and the load current $I_{PFM}$ is subtracted from the first item in Equation (6); Equation (6) is already achieved using Blocks 1 to 4, but what is output from Block 4 is a current signal, in Block 5, the current signal output from Block 4 is converted into a voltage signal for subsequent processing.

The mode switching determination unit 143 determines whether to switch from a continuous control mode to a discontinuous control mode based on the detection signal from the inductance signal detection unit 141 and the switching threshold from the compensation unit 142. When the detection signal from the inductance signal detection unit 141 is greater than the switching threshold $I_{LZC}$ from the compensation unit 142, the mode determination unit 143 determines not to switch from the current PWM mode (e.g., the continuous control mode) into the PFM mode (e.g., the discontinuous control mode); when the detection signal from the inductance signal detection unit 141 is equal to or smaller than the switching threshold $I_{LZC}$ from the compensation unit 142, the mode determination unit 143 determines to switch from the current PWM mode into the PFM mode. After determining whether to switch from a continuous control mode to a discontinuous control mode, the mode switching determination unit 143 generates a mode control signal Sm indicating whether to switch from the continuous control mode to the discontinuous control mode.

When the inductance signal from the inductance signal detection unit 141 is a current signal, the switching threshold $I_{LZC}$ can be obtained from the above Equation (5), the mode switching determination unit 143 may be implemented by a current comparator to perform comparison. When the inductance signal from the inductance signal detection unit 141 is a voltage signal, accordingly, the switching threshold $I_{LZC}$ may be converted into a voltage, and the mode switching determination unit 143 may be implemented by a voltage comparator to perform comparison. The comparator (PFM comp) in FIG. 5 is a specific implementation of the mode switching determination unit 143, and it compares the voltage signal generated by the compensation unit 142 based on Equation (6) with a voltage Vsen on the inductor detected by the inductance signal detection unit 141, so as to generate the mode control signal Sm indicating whether to switch from the continuous control mode to the discontinuous control mode.

Figure 6:
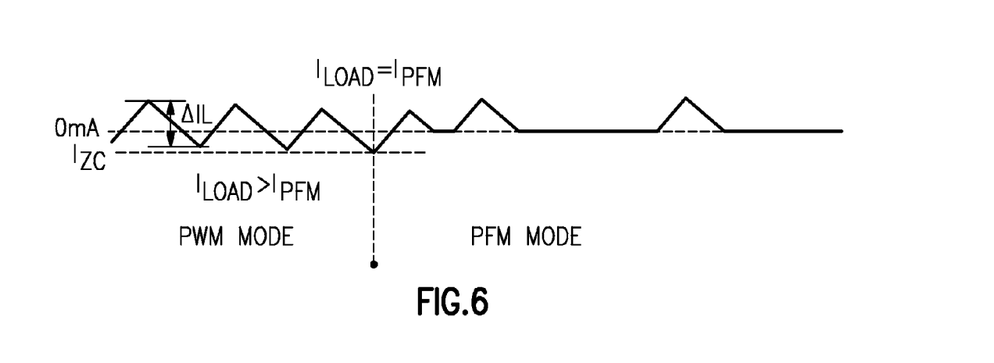
FIG. 6 schematically illustrates change of inductance current in the process of controlling to switch from a PWM mode to a PFM mode using the mode control device in FIG. 3.

FIG. 6 schematically illustrates change of inductance current in the process of controlling to switch from the PWM mode to the PFM mode by the mode control device 140 in FIG. 3. As shown in FIG. 6, the voltage converter operates in the PWM mode initially, when the load driven by the voltage converter gradually decreases, the inductance current $I_L$ on the inductor gradually decreases. When the inductance current $I_L$ on the inductor reaches the switching threshold $I_{LZC}$ output by the compensation unit 142, the mode control signal Sm output from the mode switching determination unit 143 indicates switching from the PWM mode to the PFM mode, then the voltage converter switches from the PWM mode to the PFM mode. In the PFM mode, the voltage converter performs charging and discharging operations discontinuously, and limits the inductance current $I_L$ on the inductor to be greater than zero. Herein, the inductance current $I_L$ being limited to be greater than zero is for improving operation efficiency in the PFM mode.

In the mode control device according to the embodiment of the present application, whether to switch from the continuous control mode to the discontinuous control mode is determined based on the inductance current flowing on the inductor in the voltage conversion circuit 110, and the change of the input voltage and the output voltage is compensated when determining the switching threshold, so that the voltage converter can switch from the continuous control mode to the discontinuous control mode accurately at a constant load current threshold, which improves power efficiency of the voltage converter and reduces noise in the output voltage Vout caused by change of the on-off frequency.

Figure 7:
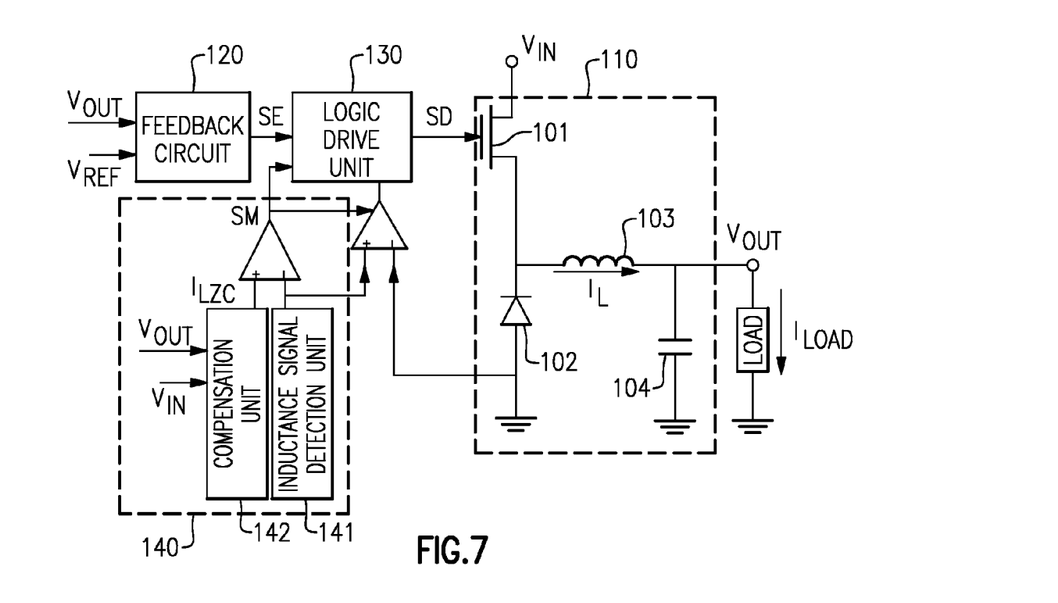
FIG. 7 is a block diagram schematically illustrating a buck converter including the mode control device according to an embodiment of the present application.

FIG. 7 is a block diagram schematically illustrating a buck converter including the mode control device according to an embodiment of the present application. The voltage conversion circuit 110, feedback circuit 120, logic drive unit 130, and mode control device 140 in FIG. 7 are the same as those in FIG. 1, and adopt the same reference numerals. FIG. 7 differs from FIG. 1 in that a zero-crossing comparator 150 is added, the zero-crossing comparator 150 starts a comparison operation when the voltage converter enables the PFM mode, for determining whether the inductance current on the inductor changes from a positive current to zero, and outputting a zero-crossing indication signal indicating whether the inductance current is larger than zero. When the zero-crossing comparator 150 determines that the inductance current changes from the positive current to zero, it instructs the logic drive unit 130 to stop the discharging operation of the voltage converter, in order to ensure that the inductance current of the voltage converter is greater than zero when the voltage converter is in the PFM mode (as shown in FIG. 5).

As shown in FIG. 7, one input of the zero-crossing comparator 150 is grounded, another input thereof is connected to the inductance current output by the inductance signal detection unit 141, and starts or stops a comparison operation under control of the mode switching determination unit 143. When the mode control signal Sm output by the mode switching determination unit 143 indicates to switch from the PWM mode to the PFM mode, the zero-crossing comparator 150 is enabled to start comparing the inductance current on the inductor with zero, and generates the zero-crossing indication signal indicating whether the inductance current on the inductor is greater than zero. When the zero-crossing indication signal of the zero-crossing comparator 150 indicates that the inductance current on the inductor is equal to or less than zero, the logic drive unit 130 may drive a switch of the voltage converting circuit to make the current on the inductor be greater than zero.

In the voltage converter described in conjunction with FIG. 7, whether to switch from the PWM mode to the PFM mode is determined based on the inductance current flowing on the inductor in the voltage conversion circuit 110, and change of the input voltage Vin and the output voltage Vout is compensated when determining the switching threshold, so that the voltage converter can switch from the continuous control mode to the discontinuous control mode accurately at a constant load current threshold, which improves power efficiency of the voltage converter and reduces noise in the output voltage caused by change of the on-off frequency.

Figure 8:
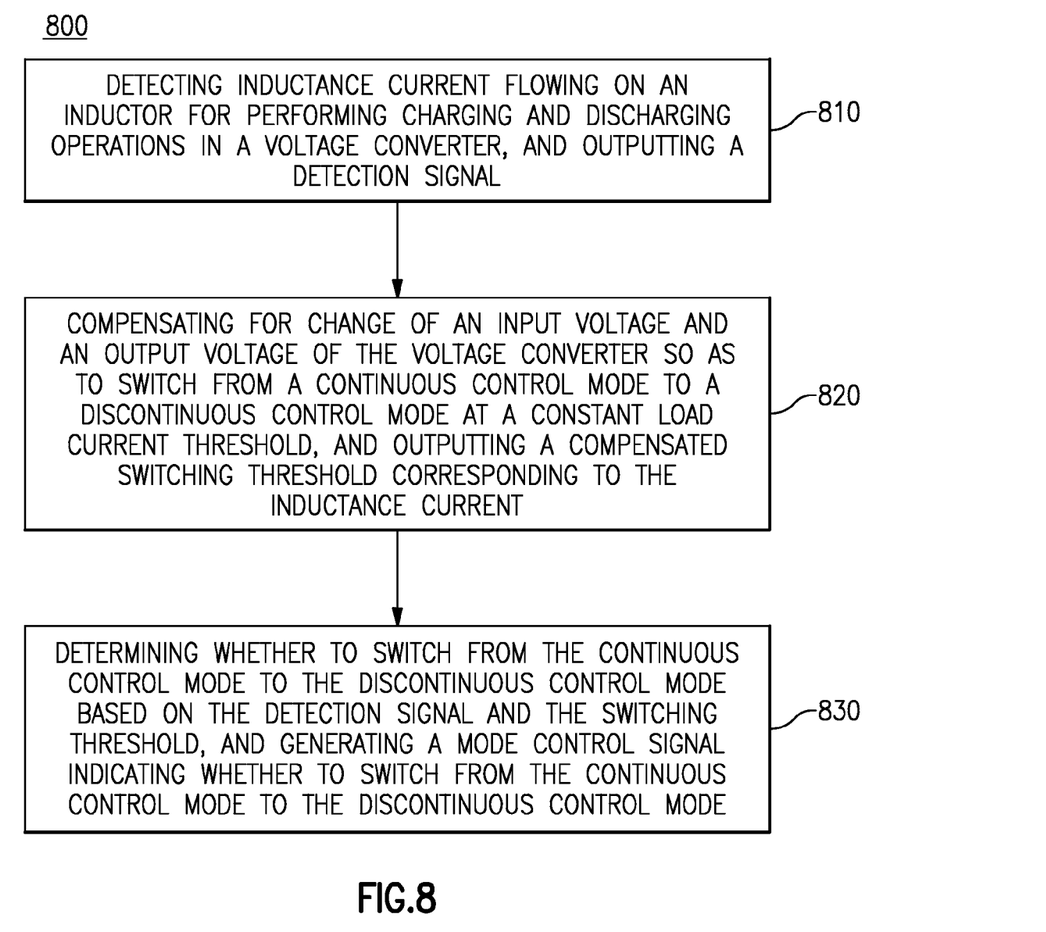
FIG. 8 is a flowchart schematically illustrating the mode control method according to an embodiment of the present application.

FIG. 8 is a flowchart schematically illustrating a mode control method 800 according to an embodiment of the present application. The mode control method 800 is applicable for controlling the voltage converter switches from a continuous operation mode to a discontinuous operation mode. The voltage converter converts an input voltage into an output voltage, which may be used for powering a load. The voltage converter may be a boost converter, a buck converter, a boost-buck converter, and may be for example the voltage converter described in conjunction with FIGS. 1 and 2. In particular, the voltage converter may include: a voltage conversion circuit including a control device and an inductor, the inductor being capable of performing charging and discharging operations, the control device being for operating under driving of a drive signal to control the charging and discharging operations of the inductor; and a logic drive unit for adjusting an operation mode for the voltage conversion circuit, and generating the drive signal for driving the control device, so as to obtain a desired output voltage.

As shown in FIG. 8, the mode control method 800 may include: detecting inductance current flowing on an inductor for performing charging and discharging operations in a voltage converter, and outputting a detection signal (S810); compensating for change of an input voltage and an output voltage of the voltage converter so as to switch from the continuous control mode to the discontinuous control mode at a constant load current threshold, and outputting a compensated switching threshold corresponding to the inductance current (S820); and determining whether to switch from the continuous control mode to the discontinuous control mode based on the detection signal and the switching threshold, and generating a mode control signal indicating whether to switch from the continuous control mode to the discontinuous control mode (S830).

In the conventional mode control technique, whether to switch from the continuous control mode to the discontinuous control mode is determined usually based on the current (i.e., load current) on the load driven by the voltage converter, and the switching threshold in this mode control technique usually varies along with the input voltage and the output voltage of the voltage converter, which makes it difficult to perform mode switching accurately, and thus lowers power efficiency of the voltage converter accordingly. Further, variation of the on-off frequency in the control device will also increase noise in the output voltage.

The mode control method 800 according to the embodiment of the present application can generate a mode switching signal for controlling the voltage converter to switch from the continuous operation mode to the discontinuous operation mode based on the inductance current on the inductor in the voltage converter, and the mode switching signal is independent of the input voltage and the output voltage of the voltage converter. This is based on the following facts: when the load current flowing through the driven load decreases, the inductance current flowing through the inductor in the voltage conversion circuit of the voltage converter also decreases; when the load current flowing through the driven load increases, the inductance current flowing through the inductor also increases. Therefore, it is possible to control to switch from the continuous control mode to the discontinuous control mode based on the inductance current on the inductor in the voltage converter, instead of the load current.

The detection signal output in S810 may be inductance current flowing on the inductor in the voltage conversion circuit, and may also be a voltage signal corresponding to the inductance current. Various techniques may be adopted to detect the inductance current flowing on the inductor, for example, a resistor with an extremely small resistance may be used to separate a small part of current signals from the inductor, or a variable resistance area of a power tube may be used to detect the inductance current, and accordingly the inductance signal may be detected by detecting a voltage between a source and a drain of the power tube when it operates in the variable resistance area. The techniques for detecting the inductance signal as adopted in S810 do not constitute a limitation to the embodiments of the present application.

In S820, a switching threshold corresponding to the inductance current is generated by compensating change of the input voltage and the output voltage of the voltage converter, so that the voltage converter switches from the continuous control mode to the discontinuous control mode at a constant load current threshold.

In the case where the voltage converter is a buck converter, the continuous control mode is the PWM control mode, and the discontinuous control mode is the PFM control mode. As described in conjunction with FIG. 4, the switching threshold corresponding to the inductance current on the inductor can be generated based on Equation (5). From Equation (5) it can be seen that, in an implementation, threshold of the load current may be maintained constant, but change of the input voltage Vin and the output voltage Vout is compensated when achieving the first item in Equation (5). The load current threshold being constant means that threshold of the load current is independent of the input voltage and the output voltage, so that it is possible to switch from the continuous control mode to the discontinuous control mode accurately. In Equation (5), both Tsw and L are fixed, $I_{PFM}$ is fixed and may be preset, and when the operation of S820 is implemented, input and output voltages of the voltage converter may be obtained, thereafter Equation (5) is achieved.

Alternatively, in order to more conveniently implement the operation of S820, it is also possible to change Equation (5) into the above-described Equation (6), achieve the (1−D)*Vout Equation (6) by sampling Vout at a sampling clock fsw, i.e., Toff*fsw*Vout, thus conveniently achieving the (1−D)*Vout in Equation (6), and Tsw and L in Equation (6) are given when designing the voltage converter, and the load current $I_{PFM}$ is also a constant value, thus Equation (6) can be achieved conveniently to obtain the switching threshold $I_{LZC}$. As for the specific implementations of obtaining the switching threshold $I_{LZC}$ based on Equation (6) in S820, descriptions provided in conjunction with FIG. 5 can be referred to.

In the case where the voltage converter is a boost converter, the continuous control mode is the PWM control mode, and the discontinuous control mode is the PFM mode, the switching threshold $I_{LZC}$ can be obtained based on Equation (9) in S820 so as to maintain $I_{PFM}$ constant.

In S830, whether to switch from the continuous control mode to the discontinuous control mode is determined based on the detection signal obtained in S810 and the switching threshold obtained in S820. When the detection signal obtained in S810 is greater than the switching threshold obtained in S820, it is determined not to switch from the continuous control mode (e.g., the PWM mode) into the discontinuous control mode (e.g., the PFM mode); when the detection signal obtained in S810 is equal to or smaller than the switching threshold obtained in S820, it is determined to switch from the continuous control mode into the discontinuous control mode. After whether to switch from the continuous control mode to the discontinuous control mode is determined, a mode control signal Sm indicating whether to switch from the continuous control mode to the discontinuous control mode is generated.

When the detection signal obtained in S810 is a current signal, in S820, the switching threshold $I_{LZC}$ being a current signal can be obtained from the above Equations (5), (6) or (9) in S820, and a current comparator is used to perform comparison so as to generate the mode control signal Sm in S830. When the detection signal obtained in S810 is a voltage signal, the switching threshold can be converted into a voltage accordingly in S820, and a voltage comparator is used to perform comparison so as to generate the mode control signal Sm in S830.

In the mode control method according to the embodiment of the present application, whether to switch from the continuous control mode to the discontinuous control mode is determined based on the inductance current flowing on the inductor in the voltage converter, and change of the input voltage and the output voltage of the voltage converter is compensated when determining the switching threshold, so that the voltage converter can switch from a continuous control mode to a discontinuous control mode accurately at a constant load current threshold, which improves power efficiency of the voltage converter and reduces noise in the output voltage caused by change of the on-off frequency.

It is noted that the PWM mode and PFM mode in the above text are merely examples of the continuous control mode and the discontinuous control mode respectively. In practice, it is also possible to carry out switching from other continuous control modes besides the PWM mode to other discontinuous control modes besides the PFM mode.

In the various examples described herein, references are made to triodes. It will be understood that such triodes can include transistors such as field-effect transistors (FETs). Such FETs can include, for example, MOSFET devices and/or transistors implemented in other process technologies. Other types of transistors can be utilized to implement one or more features of the present disclosure.

Those skilled in the art can understand, for convenience and simplicity of the description, the specific implementations of the method embodiments described above can be referred to corresponding process in the preceding product embodiments.

Those with ordinary skill in the art can appreciate that, devices and algorithm steps described with reference to the embodiments disclosed in this application may be implemented through electronic hardware, or a combination of the electronic hardware and software. As for each specific application, a person skilled in the art can use different methods to implement the described functions, but such implementations should not be construed as being beyond the scope of the present invention.

Principles and advantages of technical solutions described above are applicable to any voltage converter. The voltage converter can be applied in a variety of electronic apparatuses, which may include, but not are limited to, an electronic product, a portion of an electronic product, an electronic test equipment etc. The consumer electronic product may include, but is not limited to, a smart phone, a TV, a tablet computer, a monitor, a personal digital assistant, a camera, an audio player, a memory etc. A portion of the consumer electronic product may include a multi-chip module, a power amplifier module etc.

The above described are only specific implementations of the present technical solution, but the scope of the present technical solution is not limited thereto, and any alternatives and equivalents that can be conceivable by a person skilled in the art should be encompassed within the scope of protection of the present technical solution.

What is claimed is:

1. A voltage converter comprising:
    a voltage conversion circuit including an inductor configured to be charged and discharged to facilitate conversion of an input voltage to an output voltage, the voltage conversion circuit further including a switch configured to allow the inductor to be charged and discharged;
    a logic drive unit configured to provide a drive signal to the switch to control the charging and discharging of the inductor; and
    a mode control unit configured to provide a mode-switching signal to the logic drive unit to control switching between a pulse width modulation (PWM) mode and a pulse frequency modulation (PFM) mode based on an inductance current associated with the inductor and a load-current threshold that is substantially constant and substantially independent of the input voltage and the output voltage, the mode control unit further configured to provide compensation for a change in the input voltage and the output voltage to facilitate the substantially constant load-current threshold and to generate a switching threshold signal representative of the compensation.

2. The voltage converter of claim 1 wherein the mode control unit includes a detection unit configured to generate an inductance signal representative of the inductance current.

3. The voltage converter of claim 2 wherein the inductance signal is a current signal representative of the inductance current.

4. The voltage converter of claim 2 wherein the inductance signal is a voltage signal representative of the inductance current.

5. The voltage converter of claim 4 wherein the detection unit includes a resistive circuit configured to separate a small portion of the inductance current to yield the voltage signal.

6. The voltage converter of claim 4 wherein the detection unit includes a variable resistance area of a MOSFET power tube such that a voltage between a source and a drain of the MOSFET is representative of the inductance current.

7. The voltage converter of claim 1 wherein the compensation unit is configured to receive the input voltage and the output voltage, and generate the switching threshold signal $I_{LZC}$ based on operations represented by $$I_{LZC} = \frac{Tsw*(Vin-Vout)*Vout}{2*L*Vin} - I_{PFM},$$

where Vin is the input voltage, Vout is the output voltage, Tsw is a work cycle of the buck converter, L is the inductance of the inductor, and $I_{PFM}$ is a minimum load current in the PWM mode.

8. The voltage converter of claim 1 wherein the compensation unit is configured to receive the input voltage and the output voltage, and generate the switching threshold signal $I_{LZC}$ based on operations represented by $$I_{LZC} = \frac{Tsw*(1-D)*Vout}{2*L} - I_{PFM},$$

where Vout is the output voltage, Tsw is a work cycle of the buck converter, L is the inductance of the inductor, $I_{PFM}$ is a minimum load current in the PWM mode, and D is a duty cycle of the voltage converter and equal to the output voltage divided by the input voltage.

9. The voltage converter of claim 1 wherein the mode control unit further includes a mode switching determination unit configured to determine whether to switch between the PWM mode and the PFM mode based on an inductance signal from a detection unit and the switching threshold signal from the compensation unit, the inductance signal representative of the inductance current.

10. The voltage converter of claim 9 wherein the mode switching determination unit is further configured to generate the mode control signal based on the inductance signal and the switching threshold signal.

11. The voltage converter of claim 10 wherein the mode switching determination unit includes a comparator configured to receive the inductance signal and the switching threshold signal as inputs and generate the mode control signal as an output.

12. The voltage converter of claim 11 further comprising a zero-crossing comparator configured to start a comparison operation when the voltage converter enables the PFM mode and determine whether the inductance current changes from a positive current to zero.

13. The voltage converter of claim 12 wherein the zero-crossing comparator is further configured to generate a zero-crossing indication signal indicating whether the inductance current is larger than zero.

14. The voltage converter of claim 13 wherein the zero-crossing indication signal is configured such that when the inductance current changes from the positive current to zero, the logic drive unit is instructed to stop the discharging operation to ensure that the inductance current of the voltage converter is greater than zero when the voltage converter is in the PFM mode.

15. The voltage converter of claim 1 wherein the switch includes a transistor.

16. The voltage converter of claim 1 further comprising a feedback circuit configured to receive an output feedback of the voltage conversion circuit and adjust the charging and discharging of the inductor to obtain a desired value for the output voltage.

17. A method for operating a voltage converter, the method comprising:
    performing switching operations to charge and discharge an inductor to facilitate conversion of an input voltage to an output voltage;
    providing a drive signal to facilitate the switching operations;
    generating a mode-switching signal to control switching between a pulse width modulation (PWM) mode and a pulse frequency modulation (PFM) mode based on an inductance current associated with the inductor and a load-current threshold that is substantially constant and substantially independent of the input voltage and the output voltage;

compensating for a change in the input voltage and the output voltage to facilitate the substantially constant load-current threshold; and generating a switching threshold signal representative of the compensation.

18. An electronic apparatus comprising:
a power management system configured to provide a supply voltage;
a module configured to provide one or more functionalities for the electronic apparatus, the module further configured to utilize a regulated voltage based on the supply voltage; and
a voltage converter configured to receive the supply voltage and generate the regulated voltage, the voltage converter including a voltage conversion circuit, the voltage conversion circuit including an inductor configured to be charged and discharged to facilitate conversion of an input voltage to an output voltage, the voltage conversion circuit further including a switch configured to allow the inductor to be charged and discharged, the voltage converter further including a logic drive unit configured to provide a drive signal to the switch to control the charging and discharging of the inductor, the voltage converter further including a mode control unit configured to provide a mode-switching signal to the logic drive unit to control switching between a pulse width modulation (PWM) mode and a pulse frequency modulation (PFM) mode based on an inductance current associated with the inductor and a load-current threshold that is substantially constant and substantially independent of the input voltage and the output voltage, the mode control unit further configured to provide compensation for a change in the input voltage and the output voltage to facilitate the substantially constant load-current threshold and to generate a switching threshold signal representative of the compensation.

19. The electronic apparatus of claim 18 wherein the electronic apparatus is a portable device powered by a battery.

20. The electronic apparatus of claim 19 wherein the portable device includes a mobile phone, a tablet computer, a display, an eBook reader, or a portable digital media display.

* * * * *